(12) United States Patent
Carlo et al.

(10) Patent No.: US 7,652,078 B2
(45) Date of Patent: Jan. 26, 2010

(54) FABRICATING POLYMERS FOR OPTICAL DEVICES

(75) Inventors: Steven R. Carlo, Monroe, NY (US); Eva M. Maya, Madrid (ES); Arthur W. Snow, Alexandria, VA (US); Richard G. S. Pong, Silver Spring, MD (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 428 days.

(21) Appl. No.: 11/746,499

(22) Filed: May 9, 2007

(65) Prior Publication Data

US 2008/0004370 A1   Jan. 3, 2008

Related U.S. Application Data

(63) Continuation of application No. 10/836,625, filed on May 3, 2004, now Pat. No. 7,230,040.

(60) Provisional application No. 60/466,739, filed on May 1, 2003.

(51) Int. Cl.
*C08K 5/16* (2006.01)

(52) U.S. Cl. .......... 523/135; 523/223; 106/493
(58) Field of Classification Search ............ 523/135, 523/223; 106/493
See application file for complete search history.

(56) References Cited

U.S. PATENT DOCUMENTS 6,800,127 B2 * 10/2004 Babler .................. 106/493
6,844,377 B1 * 1/2005 Auweter et al. ......... 523/223

* cited by examiner

*Primary Examiner*—Robert D. Harlan
(74) *Attorney, Agent, or Firm*—David Yee

(57) ABSTRACT

High concentrations of dye may be prepared in combination with thermoplastic polymers and used in optical polymers as monomeric and dimeric molecular solutions. The method of preparing high concentration levels allows the control over the aggregation of dye molecules that is required to maintain effective nonlinear operation. The present invention is applicable to many systems and is essential to the successful production of working optical limiting devices and other optically transparent polymeric devices, as well as other photonic applications, such as nonlinear optics.

20 Claims, 8 Drawing Sheets

FABRICATING POLYMERS FOR OPTICAL DEVICES

CROSS-REFERENCE TO RELATED APPLICATIONS

The present application is a continuation application that claims the benefit of patent utility application of Ser. No. 10/836,625 to Carlo et al., filed on May 3, 2004, entitled "Fabricating Polymers for Optical Devices," and provisional patent application: Ser. No. 60/466,739 to Maya et al., filed on May 1, 2003, entitled "Fabrication of Polymer Nonlinear Elements for Optical Limiting," both which are hereby incorporated by reference.

GOVERNMENT LICENSE RIGHTS

This invention was made with government support under Grant No. N0014-00-WX-20408 awarded by the U.S. Naval Research Laboratory. The government has certain rights in the invention.

BACKGROUND OF THE INVENTION

The present invention provides a method for preparing high concentrations of dye molecules in polymers. More specifically, the present invention allows production of optically transparent polymeric devices, such as optical limiters, that become opaque at high light intensities. The high concentration of the nonlinear dye enables high performance optical limiting.

Colorants are a common group of polymer additives. They can be organic dyes or inorganic dyes. The nature of the colorant affects the optical properties of materials. Initially, colorless material, such as polycarbonates and those based on acrylic or styrenic polymers, can either be made translucent, opaque, colored or colorless.

In general, colorants are added to molten polymers as highly concentrated solid solutions of dyed pellets. These pellets are formed by adding a highly concentrated colorant, which is miscible with the desired host polymer, to a dye-receptive polymer. However, colored polymers formed in this way can create a three-phase system, making it more difficult to determine the relevant properties. Alternatively, the colorant may be added directly to the polymer during melt processing. In both methods, the formed colored polymers appear to have a uniform coloration at the macroscopic level. But, the dye molecules are often dispersed inhomogeneously in the polymer matrix. While this inhomogeneous dispersion may be acceptable where simple coloration is desired, it is not acceptable for certain new applications that require both high dye concentrations and the control of chromophore dispersion.

In the case of all-optical limiters the choice of both dye and polymer host is critical in formation of the polymer/dye solid solution. The dye molecule must be compatible with the host plastic, processing method and final use of the finished material, while not imparting any non-desirable rheological properties on the system. In addition, sufficient quantities of the dye have to be present for acceptable device properties, as well as formation of a molecular solution of the dye in the polymer host. The requirement of high dye concentration combined with the need for homogeneous dye distribution in the polymer matrix has necessitated the development of new methods of adding dyes to polymers to both promote molecular dispersion and limit the residence time of the polymer/dye system in conventional melt processing apparatus.

Standard industrial preparatory procedures are unable to provide the necessary concentrations or control over the aggregation of dye molecules. Currently, dye/polymer solutions can be prepared by melt processing; incorporating pigments into the polymer backbone via synthetic procedures; spray coating polymer surfaces with dye solutions; mixing the polymer and dye solution followed by spray coating; and adding highly concentrated colored pellets to conventional processing. However, each of these methods has its drawbacks.

In one instance, melt processing can involve loss of up to 75% of the dye during the current process. For example, a polymer and dye system using 200 g of polymer and 20 g of dye (10% weight/weight) resulted in a solid solution of only 2% weight/weight, which is significant if the dye is a high cost specialty dye. Conventional (proprietary) methods used to add coloration to bulk poly(carbonate) often work poorly with large dye molecules. In addition, prolonged melt processing can cause degradation of the dye and/or polymer.

Incorporating pigments via synthetic procedures also presents problems in that it requires new synthetic procedures to be developed for each polymer and dye system. The net result is the development process is slowed and can become prohibitively expensive.

In addition, spray coating polymer surfaces with dye solutions can be problematic. Proprietary methods used to add dye to the surface of poly(carbonate) have been successful with the phthalocyanine family of dyes. However, the resulting coating is difficult to grow to thicknesses greater than about 1 μm.

Even solution mixing followed by casting/spray/spin coating does not reliably yield molecular solutions. While spray coating is able to form ultra thin films, it can only reliably form films ≈1 μm thick. This method is not amenable to layered structures or films thicker than 50 μm required for phthalocyanine-based optical limiting devices.

Furthermore, adding high concentration colored pellets to conventional processing presents a challenge. The pellets are almost certainly not commercially available with the specialty dyes being used in photonic applications. These pellets may be formulated using another dye receptive polymer, which is miscible with the desired polymer host, resulting in a three-phase system. Such a result could cause changes in the chemical and physical (including photophysical) properties of the system.

Consequently, it would be desirable to have high dye concentrations of dye molecules in polymers as monomeric molecular solutions for the production of working optical limiting devices or any photonics application requiring these standards. It would also be desirable to have stringent control of dye distribution in polymers.

BRIEF SUMMARY OF THE INVENTION

One advantage of the present invention is that the general method may be applied to any polymer/dye system providing compatible solvents for dye and polymer and where a precipitating agent may be found.

Another advantage of this invention is that this method may not require any further processing of commercially available polymers or dyes with the possible exception of drying prior to processing, which may depend on the properties of the polymers and dyes.

A further advantage of this invention is that the solution mixing stage tends to ensure fine dispersion.

Yet a further advantage of this invention is that little loss of dye typically occurs during the solution processing stage.

Loss during conventional processing may still occur, but may be significantly reduced compared with the other methods of dying.

To achieve the foregoing and other advantages, in accordance with all of the invention as embodied and broadly described herein, fabrication of high concentrations of dyes in polymeric hosts may be achieved by selecting a first solvent that is suitable for a dye and polymer; selecting a second solvent that is miscible with the first solvent, in which the dye and the polymer are insoluble or have limited solubility in the second solvent; creating a resultant solution by co-dissolving the dye and the polymer in the first solvent; adding the resultant solution to the second solvent to create a polymer/dye co-precipitate and a residual solution; separating the polymer/dye co-precipitate from the residual solution; and drying the polymer/dye co-precipitate to remove solvent residue. This method of fabrication may be used for the production of optical devices.

The first solvent may include any of the following: toluene, chloroform, dichloromethane, dimethylsulfoxide, halogenated solvents, aromatic solvents, aliphatic solvents, alcohols, esters, ketones, ethers, amides and water. Like the first solvent, the second solvent may also include such compounds. However, the second solvent used may instead be methanol or ethanol. The dye used may be organic or inorganic, including but not limited to the following classes of dyes: phthalocyanines, naphthalocyanines, nigrocene, porphyrins, pyrromethenes, cyanines, fluoresceins, fluorescein derivatives or coumarins. The polymer may be a thermoplastic.

In yet a further aspect of the invention, the rate of adding the resultant solution to the second solvent is controlled. Further, separation may be carried out by filtering, gravitational settling, skimming or centrifuging. Moreover, drying may be performed by vacuum-drying, air-drying or freeze-drying.

In yet a further aspect of the invention, the dried, polymer/dye co-precipitate may be melt processed within a polymer compounder. The melt processed polymer/dye solution may be monitored either spectroscopically or nonspectroscopically. Spectroscopical techniques include ultraviolet-visible absorption spectroscopy, infrared absorption spectroscopy, nuclear magnetic resonance spectroscopy, fluorescence spectroscopy and ESR spectroscopy. Nonspectroscopical techniques include vapor pressure osmometry, calorimetry, light scattering, x-ray scattering and diffusion.

In yet a further aspect of the invention, the melted solid solution may be converted into a physical form. Conversion may be accomplished by injection molding, direct molding, extrusion, co-extrusion, stamping, shearing, pulling, pressing or smoothing.

In yet a further aspect of the invention, after conversion, the solid solution may be fabricated into an optical device that has linear and nonlinear optical properties. Such optical devices may include solid-state lasers, polymer dielectric filters, optical waveguides, electric optic devices and optical switching devices. Alternatively, the solid solution may be fabricated into an optical limiter.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention is a method for incorporating high concentrations of dyes into polymeric solids that results in homogeneous molecular solid solutions.

Figure 1:
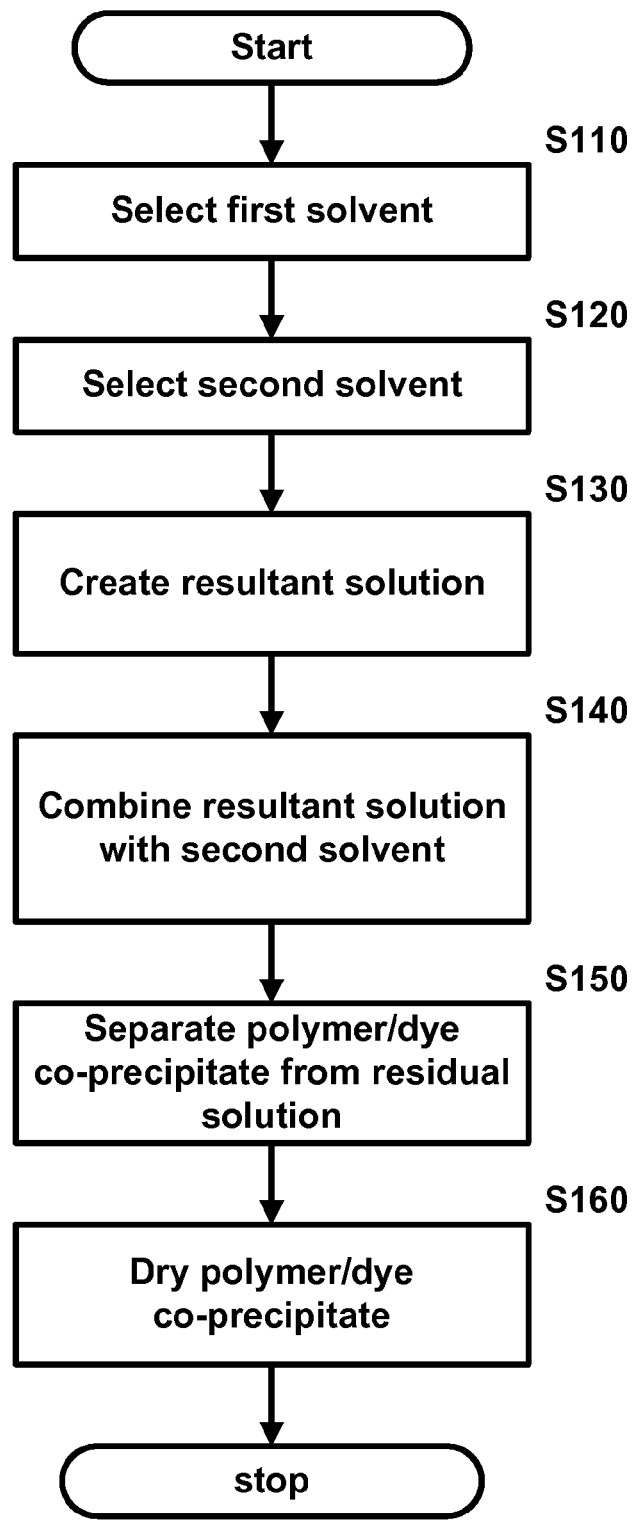
FIG. 1 is a flow diagram demonstrating how high dye/polymer concentrations may be created for optical devices.

Referring to FIG. 1, a method of preparing highly concentrated dyes may be performed in the following manner. First, in step S110 a first solvent needs to be selected for both a dye 430 and a polymer 440. When considering an appropriate first solvent, the first solvent should be suitable for the dye 430 but would not be likely to cause degradation. For example, the first solvent may be selected from any of the following: toluene, chloroform, dichloromethane, dimethylsulfoxide, halogenated solvents, aromatic solvents, aliphatic solvents, alcohols, esters, ketones, ethers, amides and water. As for dyes, it is preferable to use at least one of the following: phthalocyanines, naphthalocyanines, nigrocene, pyrromethenes, porphyrins, cyanines, fluoresceins, fluorescein derivatives, and coumarins. When considering which polymers to use, it is desirable to have a polymer 440 that is a thermoplastic. For instance, the polymer may belong to any one of the following compounds or classes of compounds: poly(carbonate), poly(styrene-acrylonitrile), poly(styrene), polyesters, polyolefins, polyesters, polyamides and conducting polymers.

Once the first solvent is selected, then a second solvent that is miscible with the first solvent needs to be selected, as shown in step S120. It is preferable for the dye 430 and polymer 440 to have limited solubility in the second solvent with insolubility being most preferred. Ideally, the second solvent may be methanol or ethanol. However, other selected second solvents may also include toluene, chloroform, dichloromethane, dimethylsulfoxide, halogenated solvents, aromatic solvents, aliphatic solvents, alcohols, esters, ketones, ethers, amides and water.

Next in step S130, the dye 430 and the polymer 440 may be co-dissolved in the first solvent to create a resultant solution.

The concentration of the resultant solution may range from less than 1 percent to 25 percent.

Following the creation of the resultant solution, the resultant solution may be added to the second solvent as indicated in step S140 to create a polymer/dye co-precipitate and a residual solution. At times, the rate of adding the resultant solution to the second solvent needs to be controlled. The primary determining factor of the level of control is the rate at which resultant solution may be intimately mixed with the second solvent. For example, control may be based on drop wise addition while stirring, piecewise addition or slow stream addition.

Control is usually necessary because it is important that the polymer 440 collapses rapidly into the polymer/dye co-precipitate. Generally, when the resultant solution is added to the second solvent, this collapse should promote an intimate dispersal of the dye molecules in the polymer matrix formed during co-precipitation. On one hand, if the polymer matrix is too concentrated, a polymer skin may form around the drop encapsulating the solvent, resulting in separated domains of polymer 440 and dye 430 when the residual solution is later removed. On other hand, if the polymer matrix is too dilute, a fine suspension of separated polymer 440 and dye 430 may be produced, which may also result in separated domains of polymer 440 and dye 430 when the residual solution is removed.

Typically, the volume of second solvent may exceed the volume of the resultant solution by a factor of 10 to 100. Moreover, the volume of the second solvent may depend on the solubility of the polymer 440 and dye 430 in various compositions of the first solvent/second solvent mixture. To insure complete precipitation, a large excess of second solvent may be necessary. The product following precipitation may appear to be a light flocculent opaque solid, which separates by a facile settling or filtering. However, if the product appears gelatinous, more second solvent may need to be added to the resultant solution. Yet, the rate of addition of the resultant solution may need to be reduced, or the rate of stirring of the second solvent may need to be increased. Occasionally, the temperature during precipitation may need to be adjusted to promote the efficiency and completeness of the precipitation.

Afterwards, it is preferable to separate the polymer/dye co-precipitate from the residual solution. Still referring to FIG. 1, this separation step is step S150. Separation may be accomplished in a number of ways, such as filtering, gravitational settling, skimming and centrifuging.

Then in step S160, the separated polymer/dye co-precipitate ought to be dried to remove solvent residue. Drying techniques may include vacuum-drying, air-drying and freeze-drying. It is important to remove solvent residue to avoid void formation when the dried, polymer/dye co-precipitate is subsequently melt processed. At this stage, the dried, polymer/dye co-precipitate may appear to be a light, feathery, opaque solid.

For illustrative purposes, assume that the vacuum-dried process is chosen. The vacuum-dried polymer/dye co-precipitate should have the dye 430 well dispersed in the polymer 440. However, such dispersion may be a microphase dispersion, which does not necessarily have the dye 430 dissolved in the polymer 440 in a molecular form required for photonic applications. Moreover, the light feathery solid may not be optimum for direct polymer processing. Therefore, an additional step should be implemented.

Figure 2:
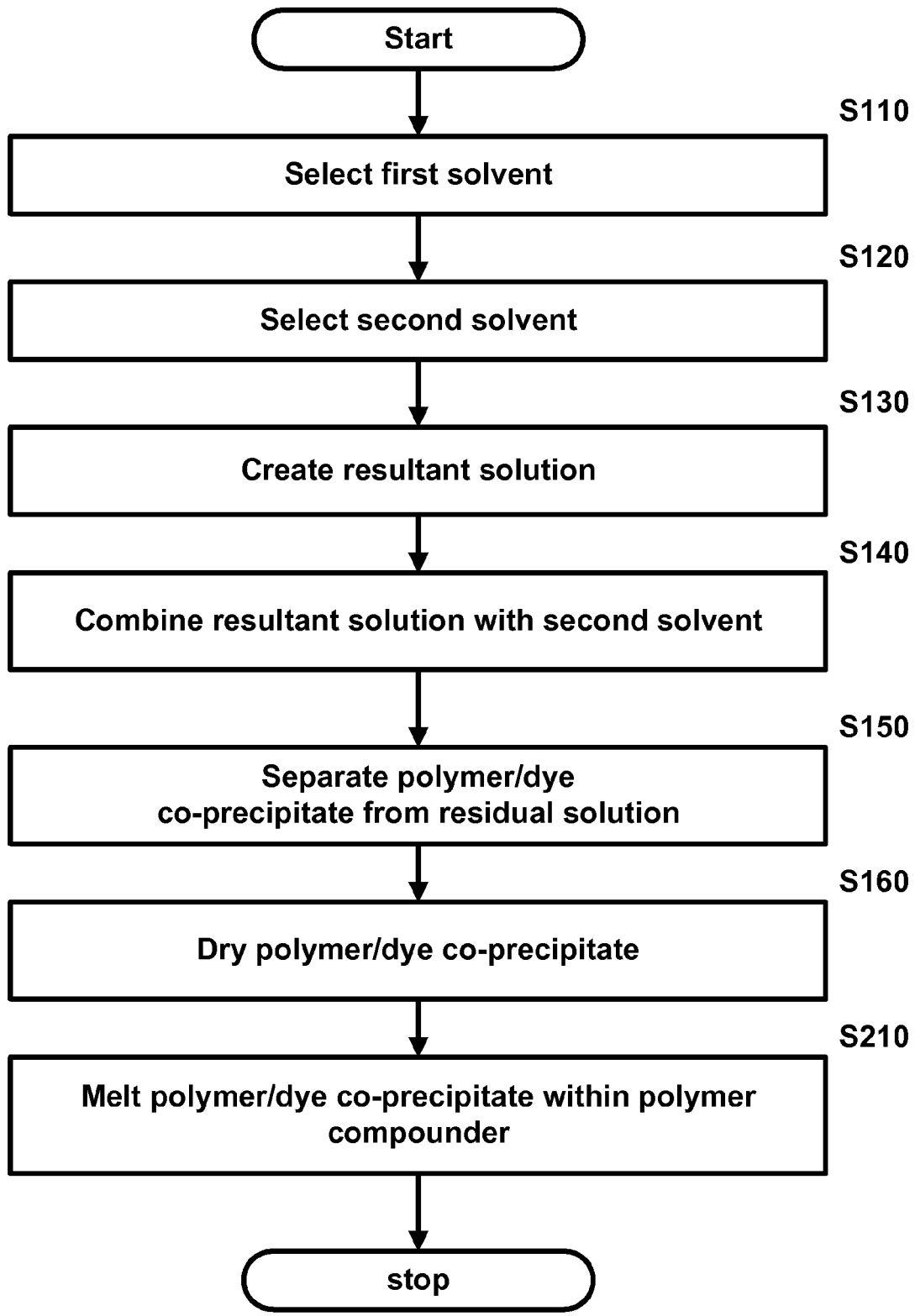
FIG. 2 is another flow diagram demonstrating how high dye/polymer concentrations may be created for optical devices.

Now, upon drying and removing the solvent residue, it is preferable to melt the dried polymer/dye co-precipitate within a polymer compounder, such as a twin-screw compounder, to create a solid solution. This step, S210 of FIG. 2, helps convert the possibility of any microphase dispersion into a molecular dispersion that would be necessary for photonic applications and into a form compatible with further processing. Time and temperature conditions may be varied to achieve a monomeric solution without undue degradation of the dye 430 or polymer 440. Further, the step of melting S210 may be monitored spectroscopically or nonspectroscopically. If done spectroscopically, monitoring may be accomplished with ultraviolet-visible absorption spectroscopy, infrared spectroscopy, nuclear magnetic resonance spectroscopy, electronic spectroscopy, fluorescence spectroscopy, or ESR spectroscopy. The preferred technique is ultraviolet-visible absorption spectroscopy. If done nonspectroscopically, monitoring may be accomplished with vapor pressure osmometry, calorimetry, light scattering, x-ray scattering or diffusion.

Figure 3:
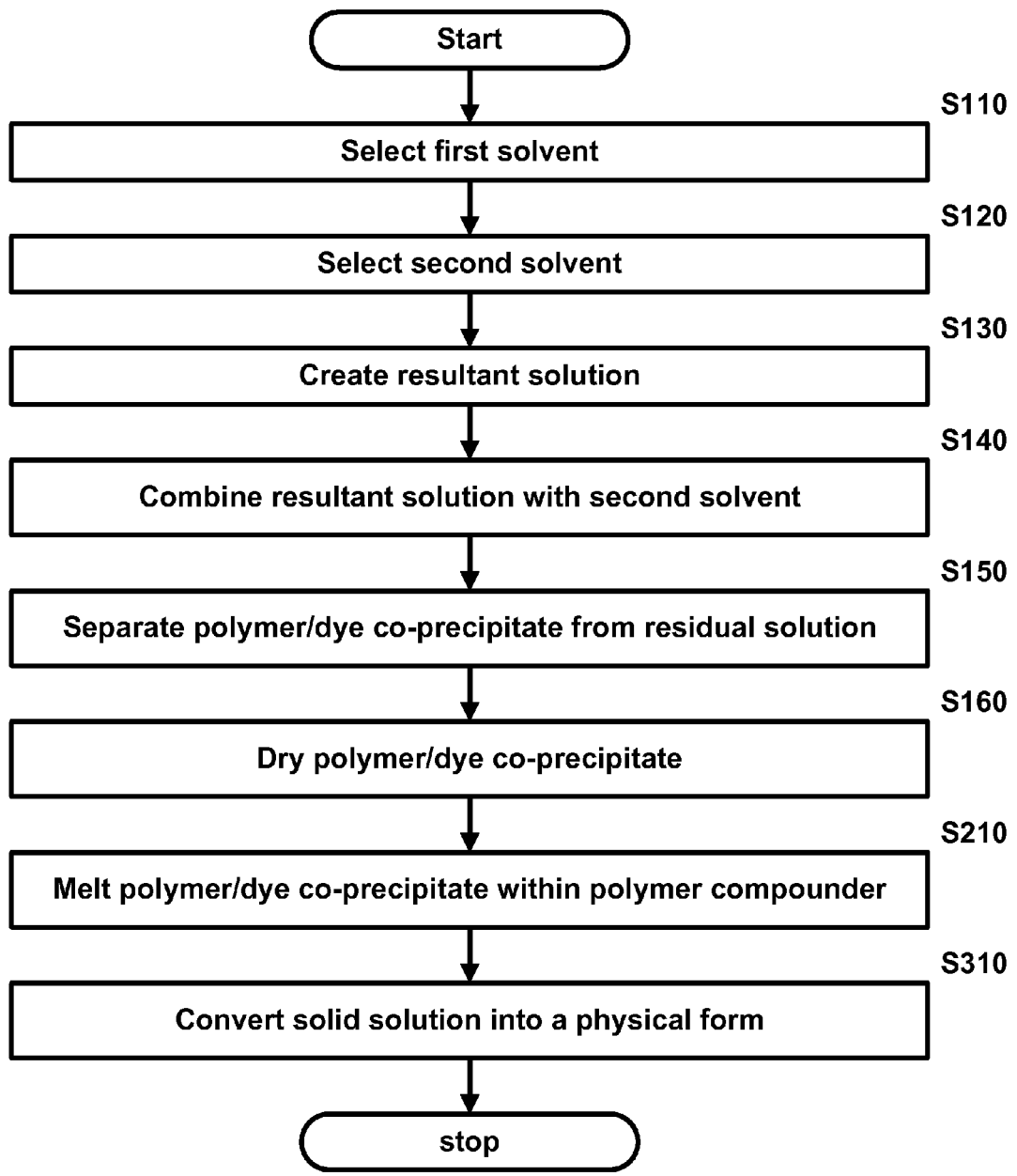
FIG. 3 is yet another a flow diagram demonstrating how high dye/polymer concentrations may be created for optical devices.

Once melt processing is complete, then the solid solution may be converted into a transparent, continuous physical form. This embodiment is shown in step S310 of FIG. 3. Conversion may be achieved in a number of ways, including injection molding, direct molding, extrusion, co-extrusion, stamping, shearing, pulling, pressing and smoothing.

Following conversion, the solid solution may be fabricated into an optical device having linear and nonlinear optical properties. Examples of linear and nonlinear optical devices include solid-state lasers, polymer dielectric filters, optical waveguides, electric optic devices and optical switching devices. Alternatively, the solid solution may be fabricated into an optical filter. Yet, again the solid solution may also be fabricated into an optical limiter.

Figure 4:
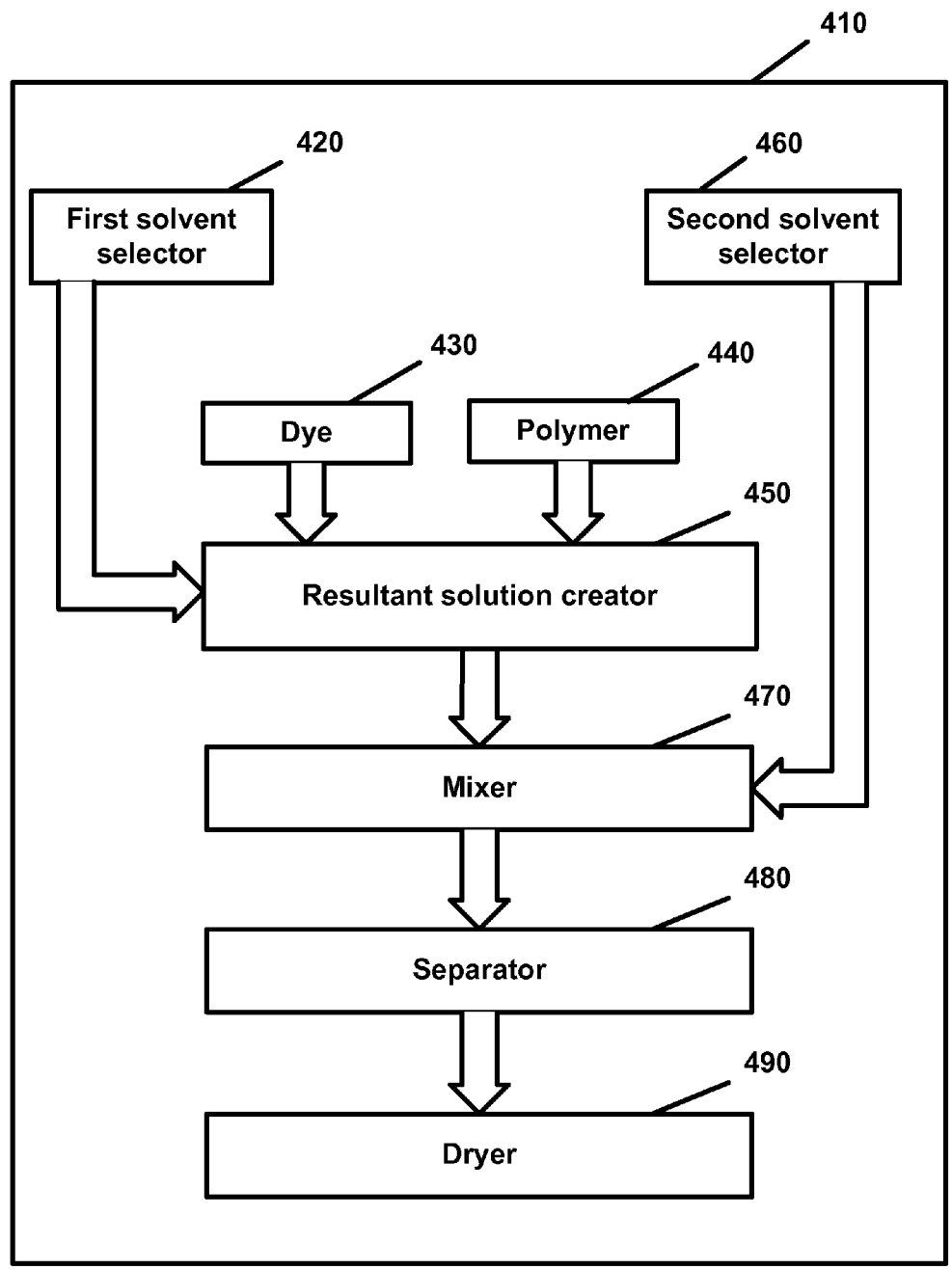
FIG. 4 is an apparatus illustrating how a device may implement this method of creating high dye/polymer concentrations.

Referring to FIG. 4, an apparatus 410 illustrates how a device may implement this method of creating high dye/polymer concentrations. Generally, there ought to be a first solvent selector 420 that is capable of selecting a first solvent for both a dye 430 and a polymer 440. Also, there ought to be a second solvent selector 460 that is capable of selecting a second solvent that is miscible with the first solvent and in which the dye 430 and the polymer 440 are insoluble or have limited solubility in the second solvent. Once the first solvent selector has selected a solvent, then the solvent, dye 430 and polymer 440 may be passed into a resultant solution creator 450 to create a resultant solution by co-dissolving the dye 430 and polymer 440 into the solvent. Next, the resultant solution and the second solvent may be mixed in a mixer 470 to create a polymer/dye co-precipitate and a residual solution. After the polymer/dye co-precipitate has formed, the polymer/dye co-precipitate may be separated from the residual solution by using a separator 480 and may be dried by using a dryer 490 to remove solvent residue.

Figure 5:
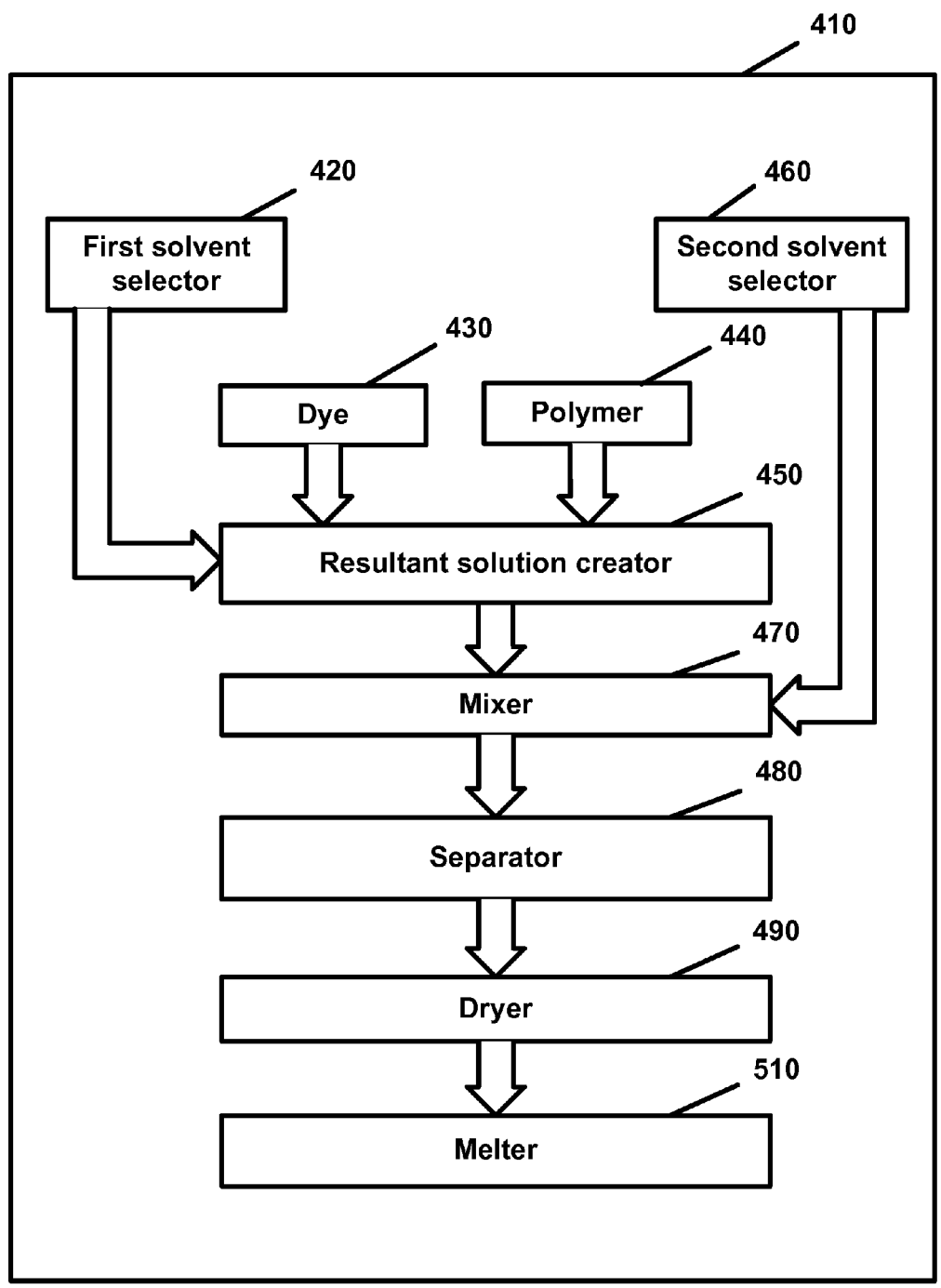
FIG. 5 is another apparatus illustrating how a device may implement this method of creating high dye/polymer concentrations.
Figure 6:
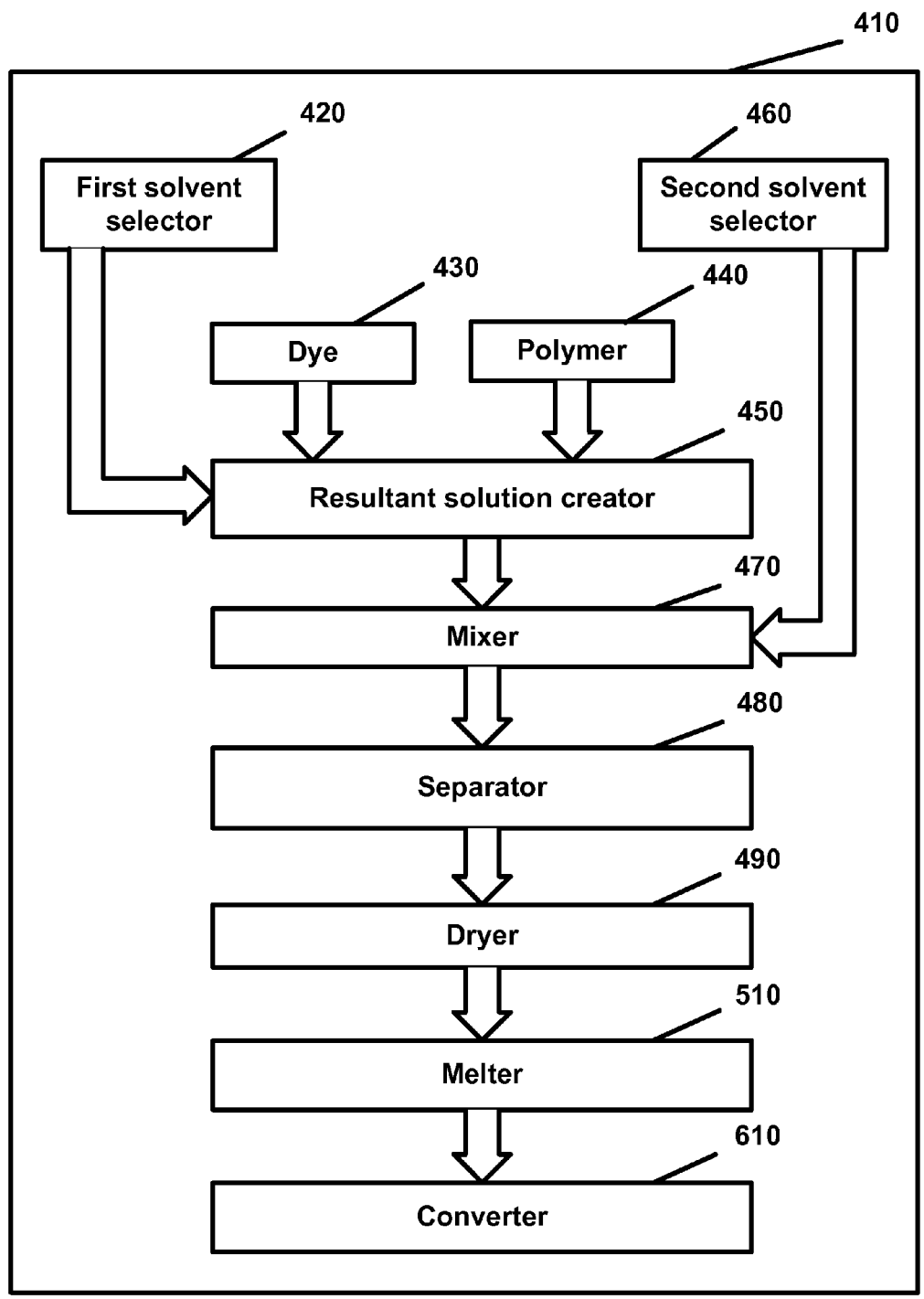
FIG. 6 is yet another apparatus illustrating how a device may implement this method of creating high dye/polymer concentrations.

The apparatus may be enhanced by additional features. As illustrated in FIG. 5, one feature that may be added is a melter 510, which could be capable of melting the dried, polymer/dye co-precipitate within a polymer compounder to create a solid solution. Another feature that may be added in addition to the melter, as depicted in FIG. 6, is a converter 610 that is capable of converting the solid solution into a physical form.

I. EXAMPLES

Typical examples of the present invention include the use of chloroform/methanol solvent/nonsolvent combination with a poly(carbonate)/lead tetrakis(cumylphenoxy)phthalocyanine dye and of a chloroform/methanol solvent/nonsolvent combination with a poly(styrene-coacrylonitrile)/lead tetrakis(cumylphenoxy)phthalocyanine dye. In both examples, drying was carried out at 120 deg. Celsius and 30 mm Hg. Extrusion was achieved using a twin-screw extruder operating at 220 deg. Celsius and 100 revolutions per minute with total residence time in the extruder of approximately 1 hour.

Figure 7:
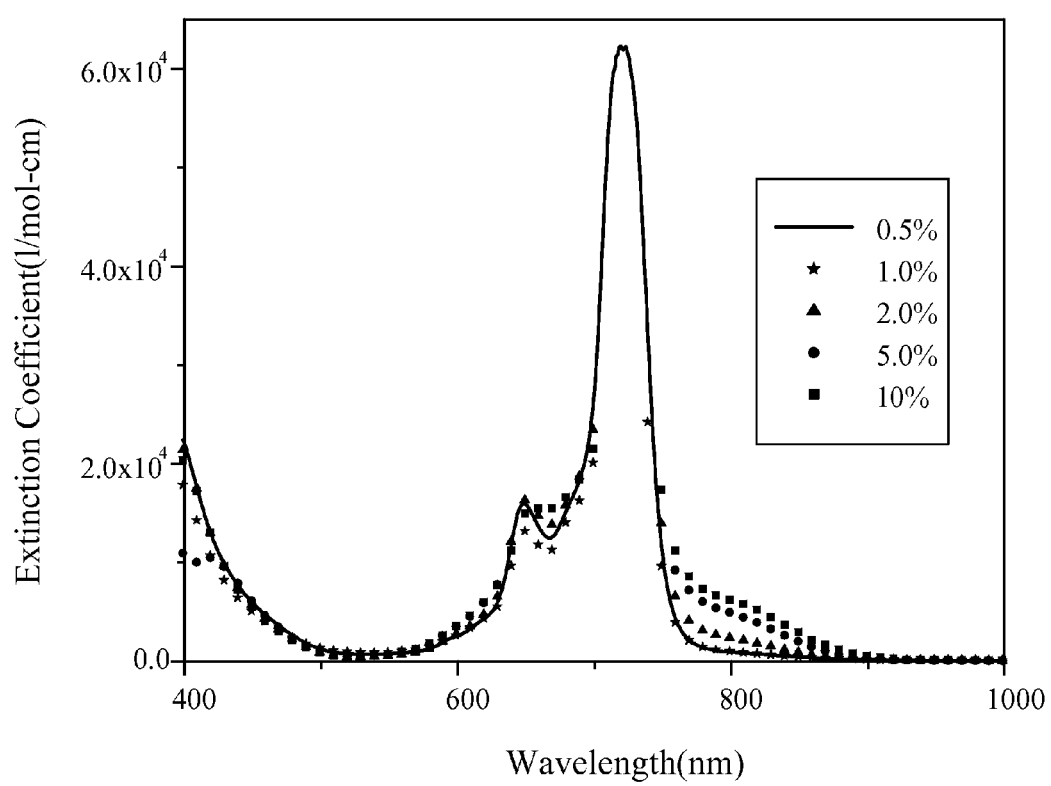
FIG. 7 depicts a UV-vis spectra of lead tetrakis(cumylphenoxy)phthalocyanine/poly(carbonate) mixture at various concentrations.

FIG. 7 shows the visible extinction coefficient spectra of 0.5% through 10% (weight/weight) lead tetrakis(cumylphenoxy)phthalocyanine dye in poly(carbonate). The percentage compositions correspond to concentrations ranging from 4.0 to 75 mM for each sample respectively. The peak present at ~720 nm is due to the monomeric form of the dye. At higher concentrations, a shoulder appears present at ~810 nm. This feature corresponds to dye-dye dimer aggregates. The spectra show that the dye is present predominately in monomeric form even at 10%.

II. Correlation between Dye Aggregation and Solvents

Aggregation may cause a perturbation of a dye's electronic structure. This effect may make it undesirable in some applications that make use of the monomer's optical or catalytic properties. Hence, control over aggregation is apparently important to maintain effective optical limitations.

One way to control aggregation pertains to the selection of solvents. Generally, because variations in solvents may alter the state of aggregation in dye compound, selecting solvents become important. In response to such aggregation dependent properties, a first solvent should be suitable for the dye 430 but would not likely cause degradation. A second solvent should be miscible with the first solvent, and in which the dye 430 and polymer 440 are insoluble or have limited solubility in the second solvent. To illustrate this importance of selecting solvents that are suitable to dyes, consider the dye phthalocyanine.

Solubility and aggregation of phthalocyanine compounds usually have different origins. Solubility tends to reside in substituent groups or coordinated ligands. Peripheral groups are primarily designed to promote solubility in particular solvents so that the phthalocyanine chromophore may be manipulated. Aggregation often resides in the phthalocyanine chromophore and often results primarily from attractive interactions between two or more of them. Solvents that would have the most pronounced effects on reducing aggregation would likely be those that compete with the aggregative interaction. While the aggregative interaction could be modified by the nature of a complexed ion in the cavity and by the electronic and steric effects of peripheral groups, the interaction often remains one of $\pi$-$\pi$ and $\pi$-$\sigma$ interactions on the frame of an organic molecule. A preferable method of assessing which solvents compete with this interaction is to observe the frequency shift that occurs in the Q-band of the monomer as the solvent is changed and how it departs from a dependence on refractive index.

Phthalocyanine (Pc) compounds with nonionic peripheral groups in organic solution may display a dependence on solvents that is influenced by the peripheral group and correlates with solvent polarity. One example is the $CUPc(\beta-SO_2NHC_{18}H_{37})_4$, whose dimerization constant in various solvents decreases in the following order: $CCl_4$>benzene>toluene>$CHCl_3$>dioxane>DMF>THF. A solvent with a lower dielectric constant is usually less able to screen the $\pi$-$\pi$ interaction from inducing formation of a dimer. There may also be thermodynamic data for this phthalocyanine system in benzene and $CCl_4$ solvents, where in both the enthalpy and entropy are negative as would be expected. Changing solvent from benzene to $CCl_4$ should increase the enthalpy from −10 to −13 kcal/mol, which may also afford better screening effect of benzene. In another example of a phthalocyanine compound with nonionic but more polar peripheral groups and a solubility that spans $CCl_4$ to water, a more complicated dependence on solvent character may be observed. In this system based on $CuPc(\beta-CH_2OCH(CH_2O(CH_2CH_2O)_3CH_3)_2)_4$, the solvent order of decreasing aggregation may be: water>methanol>ethanol>$CCl_4$>DMF>$CHCl_3$>THF. In this case, the peripheral groups may already provide a significant dielectric screen. A conjecture for this order of aggregation dependence on solvent could be that a hydrophobic interaction of phthalocyanine ring toward water and alcohols promotes a very strong aggregation. This aggregation may be followed by the solvent polarity effect starting with $CCl_4$, which incrementally adds to screening phthalocyanine rings from each other as the solvents become more polar.

A final example is the phthalocyanine tetrasulfonate system. This system may be complicated by having very small hydrophilic ionic peripheral groups bonded directly to the hydrophobic phthalocyanine ring. In addition to the $\pi$-$\pi$ phthalocyanine attractive forces, there may be coulomb repulsive forces from the negative charge of the sulfonate groups. The sulfonate groups should promote aqueous solubility of the hydrophobic phthalocyanine ring of the monomer, but this solubilization could work equally well with phthalocyanine aggregates. In water, the phthalocyanine tetrasulfonate family of compounds may have some of the highest dimerization constants measured. Addition of a water-soluble alcohol may lower the dimerization constant, and the less polar alcohols are likely more effective. The alcohol tends to have a weaker hydrophobic interaction with the phthalocyanine and may provide some screening against the dimerization. The thermodynamics of the phthalocyanine sulfonate dimerization are particularly interesting and may provide some valuable insight to the roles that water and other additives play in this process. Some very careful and complete data for the entropy of dimerization of the $CoPc(\beta-SO_3Na)_4$ system may show a temperature dependence that is initially unexpected. With increasing temperature, the entropy might become less negative and might cross over to positive values at the higher temperatures. A dimerization process should be negative in entropy. However, if positive entropy change is desired, it is preferable to release water molecules coordinated with the monomer during the dimerization process. The additional energy required to release the water molecules should show up in a diminished enthalpy.

Addition of large quantities of water miscible solvents and organic compounds such as DMF, foramide, urea, thiourea and pyridine, as well as alcohols to aqueous solutions of phthalocyanine sulfonates, normally has the effect of lowering the dimerization constant. Both entropy and enthalpy effects may be involved, where the former may focus on breaking up the water structure around the monomer, and the latter may focus on any interaction and screening action of the organic agent with the phthalocyanine ring.

III. Applications

There are many applications for phthalocyanine compounds such as pigments, xerography, laser printing and optical recording. Most of these are dependent on a solid-state property derived from an intermolecular cooperativity of phthalocyanine molecular elements in an ordered array. However, there may be some applications that are critically impacted by the phenomenon of aggregation, particularly those that utilize a property derived from the unaggregated state or a state where the aggregation state is very low.

Examples include optical filters, photodynamic therapy and optical limiting, where in each of these cases it is important that aggregation be suppressed or restricted.

A. Optical Filters

According to the International Union of Pure and Applied Chemistry (IUPAC), an optical filter is a device that reduces the spectral range or radiant power of incident radiation upon transmission of radiation. See *IUPAC Compendium of Chemical Terminology* (2d ed. 1997), available at http://www.iupac.org/goldbook/O04307.pdf. Examples of devices for the reduction of the spectral range include bandpass, cut-off and interference filters. Examples of devices for the reduction of the radiant power include neutral density and attenuance filters.

The photochemical stability and spectral absorption line shape of the monomeric phthalocyanine chromophore are typically attractive features for optical filter applications. These features may be useful when the spectral distribution and intensity from an illumination source must be altered or precisely controlled. The narrow width of the phthalocyanine Q-band is particularly useful in achieving a sharp threshold in wavelength. Filters using organic dyes typically involve incorporation of the dye as a homogeneous blend in a glass, gelatin or plastic. Incorporating dyes that have strong tendencies to aggregate into these matrices often requires a thermodynamic compatibility or a kinetic quench to obtain the dye dispersed in a nonaggregated state.

Gelatin filters may be used with water-soluble dyes and may be generated by simple evaporation of an aqueous co-solution of dye and gelatin followed by encapsulation. With the exception of the water-soluble phthalocyanine dendrimer, most phthalocyanine compounds strongly aggregate under these conditions and do not appear to be good candidates for this sort of filter.

The sol-gel process may be used to incorporate phthalocyanine compounds into rigid silica and alumina glassy matrices. These incorporations may involve water-soluble tetra-sulfonated phthalocyanine compounds dispersing in tetramethoxysilane and butoxyaluminoxy triethoxysilane. During the cure of these matrices, an aggregation may be observed and attributed to the change in the alcohol to water ratio accompanying curing reaction. Some control over the aggregation could be exercised by regulating the pH and the addition of disaggregating agents.

The dispersal of phthalocyanine compounds into thermoplastic and thermoset polymers may generate an optical filter that is flexible and may be cut to a desired size and shape. This dispersal may also require some degree of compatibility between the polymer matrix and the phthalocyanine to generate a homogeneous solution of the monomeric dye in the plastic. The phthalocyanine peripheral groups may at times be designed to promote this compatibility. For example, the cumylphenoxy group may promote dispersal of the corresponding tetra-substituted phthalocyanine in a poly(carbonate) matrix. For the thermoplastic polymer, the dispersal may be accomplished by simple co-dissolution of the phthalocyanine compound and polymer in a common solvent followed by casting a film. Such filters composed of octa-α-butoxy substituted phthalocyanines blended into vinylacetate-ethylene copolymer and cellulose acetate films may help regulate plant growth. The slow evaporation of the solvent may result in dye aggregation or a phase separation. It may be possible to avoid this result by co-precipitating the dye and plastic, then melt processing this dispersed mixture. The higher processing temperature and rapid quench improves the avoidance of aggregation. For a thermoset polymer, such as an epoxy, the dye may be dissolved in the thermoset monomer or low molecular weight prepolymer. Then high molecular weight polymer may be formed through a curing reaction into a three-dimensional network that occludes the dye. If the phthalocyanine peripheral groups are designed to participate in the curing reaction by covalently linking to the network, prospects may be improved for a uniform dispersal and avoidance of aggregation. An example of such a system is an aminophenoxy tetra-functionalized phthalocyanine incorporated into a polyurethane or epoxy thermoset.

B. Photodynamic Therapy

Photodynamic therapy is a medical treatment directed against target tissue in which a molecular photosensitizer is selectively adsorbed then irradiated to catalytically generate singlet oxygen. The localized concentration of singlet oxygen tends to attack and kill the tissue. The phthalocyanine chromophore may be known as one of the most effective photosensitizers in this application. Critical features of applying phthalocyanine chromophore in photodynamic therapy include a selective uptake of the dye into the target tissue or tumor, a strong absorption in the far red or near IR, a long triplet excited state lifetime, a good photo-oxidative stability and an excretion from the body after therapy. Selective uptake into the target tissue may be a challenge for the design of peripheral groups, which involves considerations of water solubility, lipophilicity and penetration of cell membranes. A strong absorption in the far red and near IR may accommodate a good depth of penetration by the light into the tissue. The phthalocyanine and naphthalocyanine chromophores in the monomeric state may meet this feature nicely. The triplet excited state lifetime is usually an aspect where phthalocyanine aggregation is a very important concern. Photochemical stability may correlate with the triplet excited state lifetime, as well as with the solvent and electron withdrawing and donating character of peripheral substituents.

In the process of generating singlet oxygen catalyzed by a phthalocyanine sensitizer, the first step is often light absorption by this chromophore and transition to a singlet excited state. This excited state may have a nominal sub-nanosecond lifetime, and could return to the ground state with fluorescence or undergo intersystem crossing to the triplet excited state. The lifetime of this triplet state may be a factor of $10^3$ to $10^6$ longer, which should be sufficient time for an energy transfer reaction with molecular oxygen to convert the oxygen from its ground state triplet to the reactive singlet form. The longer the phthalocyanine excited state triplet lifetime can be extended, the more efficient the generation of singlet oxygen may be. Singlet oxygen typically reacts with electron rich tissue components, such as cholesterol, unsaturated fatty acids, protein amino acid residues containing cysteine, histidine and tryptophan, and the guanine and thymine bases of DNA.

Factors that extend the excited state triplet lifetime include the selection of the metal ion and, in particular, a resistance to aggregation. Phthalocyanines complexed with paramagnetic ions might have shortened excited state lifetimes and diminished photoactivity compared with those complexed diamagnetic metal ions. Complexed ions, such as Al, Zn and Si, may have longer excited state triplet lifetimes. Yet, aggregation of phthalocyanines may shorten the excited state lifetimes and reduce the efficiency of singlet oxygen production. This characteristic may be observed though numerous examples, including (1) a comparison of zinc tetrasulfonated phthalocyanine and naphthalocyanine in an aqueous buffer with and without cetyl pyridinium chloride added as a disaggregating agent; (2) measurement of excited state dynamics of free-base and zinc tetrasulfonated phthalocyanine as an aggregate in buffered water and disaggregated in DMSO; (3) dimerization, singlet oxygen generation and cytotoxic effects on HeLa cells of a series quaternary ammonium substituted zinc phthalocyanines; (4) correlation of dimerization, triplet state lifetime, fluorescence quantum yield and singlet oxygen generation with a pH dependence for a disulfonated aluminum phthalocyanine; (5) correlation of phthalocyanine uptake into mouse carcinoma cells with variable sulfonate substitution, overall hydrophobicity and degree of aggregation of an aluminum phthalocyanine series of compounds; and (6) examination of aggregation in tumor tissue, skin and combinations of solvents, buffers, disaggregating surfactants and biomaterials of a series of zinc phthalocyanine compounds with variable phenylsulfonate substitution. All of these examples tend to indicate the importance of disaggregating the phthalocyanine chromophore to the monomeric form in the biological medium to obtain an efficient generation of singlet oxygen for the cytotoxic activity on selected tissue. To obtain phthalocyanine compounds in the monomeric state, several strategies may be employed, including the use of disaggregating agents and surfactants, as previously discussed. These approaches have the disadvantage that dilution on administration will result in aggregate formation. However, to overcome this challenge, the dendrimer approach may be used. Alternatively, silicon axial substitution with a naphthalocyanine chromophore may be used.

With aggregation controlled, the present invention may be used to create a biocompatible system. In general, such system may be created by combining a dye, such as a phthalocyanine compound, with a biocompatible polymer, such as cellulose. As a result, the oxygen radicals needed for medically treating targeted tissues or tumors may be formed.

C. Optical Limiting

Similar to optical filters, the dispersal of phthalocyanine compounds into thermoplastic and thermoset polymers may also generate an optical limiter that is flexible and may be cut to a desired size and shape. This dispersal may require some degree of compatibility between the polymer matrix and the phthalocyanine to generate a homogeneous solution of the monomeric dye in the plastic. The phthalocyanine peripheral groups may at times be designed to promote this compatibility.

Optical limiters are nonlinear optical devices that can rapidly attenuate transmitted light to a desirable intensity threshold. They may be utilized to protect eye and optical sensing equipment from sudden exposures to high intensities of irradiation from a variety of sources. The nonlinear optical properties of a number of phthalocyanines may be examined with an emphasis on the design of materials with large nonlinear absorption coefficients. In this photochemistry, a reverse saturable absorption mechanism, which is a sequential two-photon mechanism, may be assigned. The phthalocyanine chromophore may be initially excited to the first singlet excited state followed by a rapid intersystem crossing to the first excited triplet state. If this triplet state has a sufficiently long lifetime, its population may reach a threshold where a second photon absorption could occur and result in a transition from the first to the second excited triplet state. This second transition tends to have a very high transition moment and might become the dominant transition. The onset of this second transition may cause a very strong nonlinear attenuation in transmitted light. For eye protection, a very fast response (e.g., <1 nsec) is essential. Like the photodynamic therapy, a critical feature of this mechanism includes a long lifetime first triplet excited state. Certain complexed heavy metal ions, such as lead and indium, may promote the intersystem crossing to the first triplet state. In most cases, dimerization and aggregation of phthalocyanine chromophores may cause a substantial shortening of the triplet state lifetime. As such, phthalocyanine compounds designed for optical limiting need features that avoid aggregation.

Devices used for optical limiting usually require that the phthalocyanine component have a very short optical path length. Accordingly, phthalocyanine compounds may be incorporated as a confined concentrated solution or as a transparent thin film. In either case, aggregation is often an issue that requires control. In the former case, axial substitution may be sufficient to diminish aggregation in solution such that significant optical limiting is observable. Various solutions with axial substitutions include indium phthalocyanine with axial fluorophenyl and trifluoromethylphenyl substitution, and titanium phthalocyanine with substituted catechol axial substituents.

Figure 8:
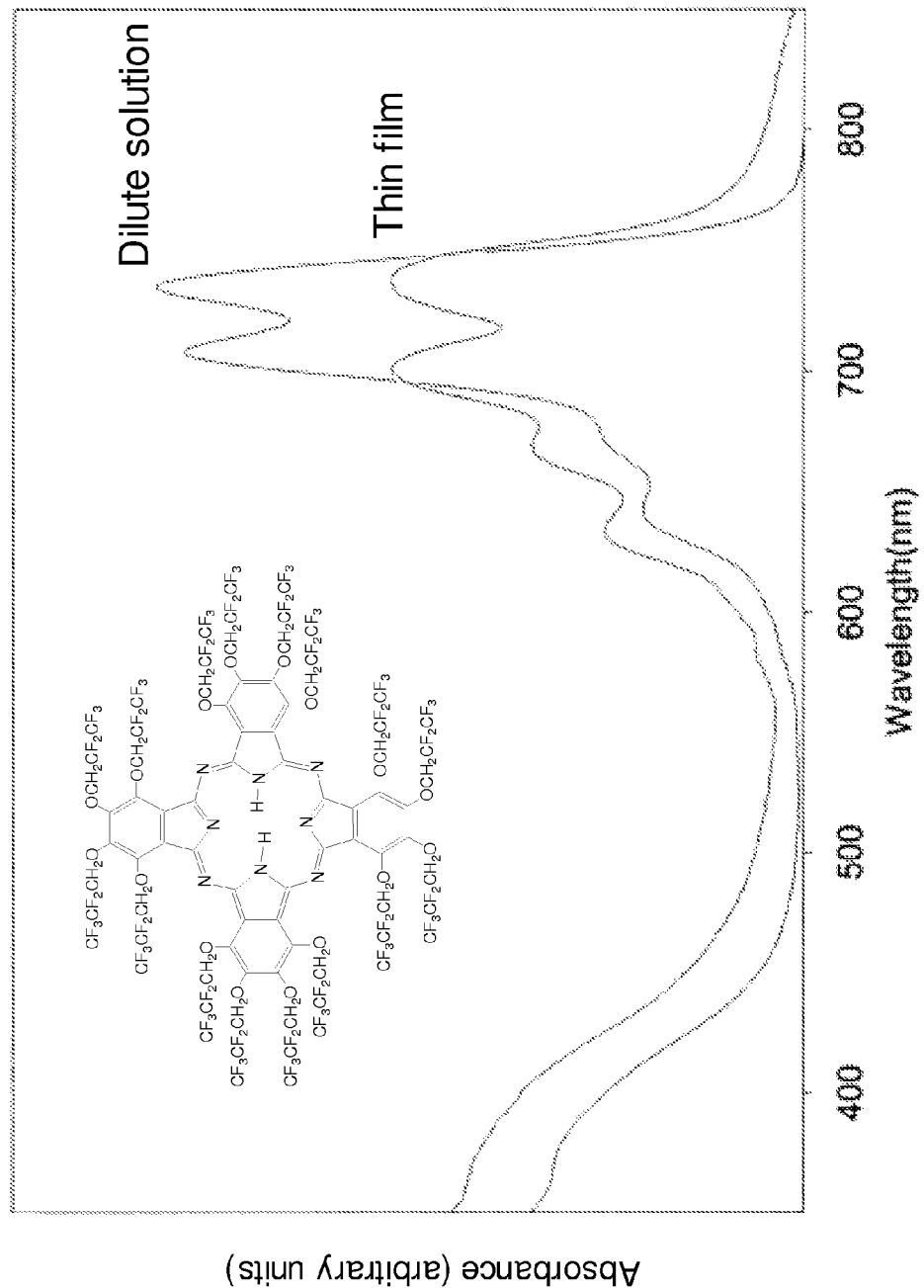
FIG. 8 highlights a UV-vis spectra of hexadeca(2,2,3,3,3-pentafluoropropoxy) phthalocyanine in dilute acetone solution and as a solid-state thin film.

As solid-state films, electronic absorption spectra of these polymer/dye systems may display significant aggregation as do other systems, which may have potential as a liquid solution-based optical limiter. Spectra of thin films of liquid phthalocyanines may also display aggregation. However, the hexadeca(perfluoroalkoxy) substituted phthalocyanines with a variety of metal ion substitutions may be remarkably unaggregated in the form of a solid-state film, as illustrated in FIG. 8. Moreover, significant nonlinear absorptions may be observed.

Thus overall, the present invention preferably uses solid-state solutions. When using this method of preparing high concentrations of dye molecules in polymers, this form of polymer-based samples tend to be easier to handle than liquid solution samples. More importantly, by appropriately choosing a dye molecule, polymer and solvent, aggregation may be controlled.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may have higher dye concentrations that exceed 25 percent. In another example, the present invention may be applied to other optical devices, such as sunglasses.

What is claimed is:

1. A method of fabricating high concentrations of dyes in polymeric hosts comprising the steps of:
   a. selecting a first solvent for both a dye and a polymer;
   b. selecting a second solvent that is miscible with the first solvent and in which the dye and the polymer have limited solubility in the second solvent;
   c. creating a resultant solution by co-dissolving the dye and the polymer in the first solvent;
   d. adding the resultant solution to the second solvent to create a polymer/dye co-precipitate and a residual solution;
   e. separating the polymer/dye co-precipitate from the residual solution;
   f. drying the polymer/dye co-precipitate to remove solvent residue;
   g. melting the dried, polymer/dye co-precipitate within a polymer compounder to create a solid solution; and
   h. converting the solid solution into a physical form; and wherein the step of melting is monitored spectroscopically, using one of the following techniques:
 a. ultraviolet-visible absorption spectroscopy;
 b. infrared absorption spectroscopy
 c. nuclear magnetic resonance spectroscopy;
 d. fluorescence spectroscopy; and
 e. ESR spectroscopy.

2. A method according to claim 1, wherein the first solvent includes at least one of the following solvents:
 a. toluene;
 b. chloroform;
 c. dichloromethane; and
 d. dimethylsulfoxide.

3. A method according to claim 1, wherein the first solvent includes at least one of the following classes of solvents:
 a. halogenated solvents;
 b. aromatic solvents;
 c. aliphatic solvents;
 d. alcohols;
 e. esters;
 f. ketones;
 g. ethers;
 h. amides; and
 i. water.

4. A method according to claim 1, wherein the dye includes at least one of the following:
 a. phthalocyanines;
 b. naphthalocyanines;
 c. nigrocene;
 d. porphyrins;
 e. pyrromethenes;
 f. cyanines;
 g. fluorescein;
 h. fluorescein derivatives; and
 i. coumarins.

5. A method according to claim 1, wherein the second solvent includes at least one of the following:
 a. methanol; and
 b. ethanol.

6. A method according to claim 1, wherein the second solvent includes at least one of the following solvents:
 a. toluene;
 b. chloroform;
 c. dichloromethane; and
 d. dimethylsulfoxide.

7. A method according to claim 1, wherein the second solvent includes at least one of the following classes of solvents:
 a. halogenated solvents;
 b. aromatic solvents;
 c. aliphatic solvents;
 d. alcohols;
 e. esters;
 f. ketones;
 g. ethers;
 h. amides; and
 i. water.

8. A method according to claim 1, wherein the dye and the polymer are insoluble in the second solvent.

9. A method according to claim 1, wherein the rate of "adding the resultant solution to the second solvent" is controlled.

10. A method according to claim 1, wherein "fabricating high concentrations of dyes in polymeric hosts" are conducted for the production of optical devices.

11. A method of fabricating high concentrations of dyes in polymeric hosts comprising the steps of:
 a. selecting a first solvent for both a dye and a polymer;
 b. selecting a second solvent that is miscible with the first solvent and in which the dye and the polymer have limited solubility in the second solvent;
 c. creating a resultant solution by co-dissolving the dye and the polymer in the first solvent;
 d. adding the resultant solution to the second solvent to create a polymer/dye co-precipitate and a residual solution;
 e. separating the polymer/dye co-precipitate from the residual solution;
 f. drying the polymer/dye co-precipitate to remove solvent residue;
 g. melting the dried, polymer/dye co-precipitate within a polymer compounder to create a solid solution; and
 h. converting the solid solution into a physical form; and
wherein the step of melting is monitored non-spectroscopically, using one of the vapor pressure osmometry; following techniques:
 a. vapor pressure osmometry;
 b.. calorimetry;
 c. light scattering;
 d. x-ray scattering; and
 e. diffusion.

12. A method according to claim 11, wherein the first solvent includes at least one of the following solvents:
 a. toluene;
 b. chloroform;
 c. dichloromethane; and
 d. dimethylsulfoxide.

13. A method according to claim 11, wherein the first solvent includes at least one of the following classes of solvents:
 a. halogenated solvents;
 b. aromatic solvents;
 c. aliphatic solvents;
 d. alcohols;
 e. esters;
 f. ketones;
 g. ethers;
 h. amides; and
 i. water.

14. A method according to claim 11, wherein the dye includes at least one of the following:
 a. phthalocyanines;
 b. naphthalocyanines;
 c. nigrocene;
 d. porphyrins;
 e. pyrromethenes;
 f. cyanines;
 g. fluorescein;
 h. fluorescein derivatives; and
 i. coumarins.

15. A method according to claim 11, wherein the second solvent includes at least one of the following:
 a. methanol; and
 b. ethanol.

16. A method according to claim 11, wherein the second solvent includes at least one of the following solvents:
 a. toluene;
 b. chloroform;
 c. dichloromethane; and
 d. dimethylsulfoxide.

17. A method according to claim 11, wherein the second solvent includes at least one of the following classes of solvents:

a. halogenated solvents;
b. aromatic solvents;
c. aliphatic solvents;
d. alcohols;
e. esters;
f. ketones;
g. ethers;
h. amides; and
i. water.

18. A method according to claim 11, wherein the dye and the polymer are insoluble in the second solvent.

19. A method according to claim 11, wherein the rate of "adding the resultant solution to the second solvent" is controlled.

20. A method according to claim 11, wherein "fabricating high concentrations of dyes in polymeric hosts" are conducted for the production of optical devices.

* * * * *